United States Patent [19]

O'Donovan et al.

[11] Patent Number: 6,039,514
[45] Date of Patent: Mar. 21, 2000

[54] APPARATUS AND METHOD FOR DRILLING HOLES IN DIMENSIONAL LUMBER

[75] Inventors: Tim O'Donovan, Sioux Lookout; Don Fenelon, Hudson, both of Canada

[73] Assignee: McKenzie Forest Products. Inc., Ontario, Canada

[21] Appl. No.: 09/167,610

[22] Filed: Oct. 6, 1998

[30] Foreign Application Priority Data

Nov. 13, 1997 [CA] Canada .................................. 2221072

[51] Int. Cl.[7] .................................................. B23B 35/00
[52] U.S. Cl. ........................... 408/1 R; 408/51; 408/53; 408/95
[58] Field of Search ................................. 408/43, 48, 49, 408/51, 53, 87, 95, 1 R

[56] References Cited

U.S. PATENT DOCUMENTS

| | | | |
|---|---|---|---|
| 1,755,401 | 4/1930 | Koehl et al. ............................... | 408/51 |
| 1,884,752 | 10/1932 | Krueger ..................................... | 408/51 |
| 4,728,229 | 3/1988 | Memmel et al. .......................... | 408/53 |

FOREIGN PATENT DOCUMENTS

| | | | |
|---|---|---|---|
| 2846770 | 5/1980 | Germany .................................. | 408/53 |
| 361708 | 6/1962 | Switzerland .............................. | 408/51 |
| 1423383 | 9/1988 | U.S.S.R. ................................... | 408/53 |
| 1354435 | 5/1974 | United Kingdom ...................... | 408/53 |

OTHER PUBLICATIONS

Advertisement for a pre–drilled stud system from the *Logging & Sawmilling Journal*, Jul./Aug. 1997 edition (p. 60).

Primary Examiner—Daniel W. Howell
Attorney, Agent, or Firm—Marshall, O'Toole, Gerstein, Murray & Borun

[57] ABSTRACT

An apparatus for drilling holes in multiple pieces of lumber of uniform width and which is capable of processing more than one width is disclosed. The drill bits are arranged in rows and the spacing between drill bits differs from row to row so as to permit the drilling of holes in more than one size of lumber. The header in which the drill bits are mounted is adapted to travel vertically along two parallel guides. Stabilizers prevent the lumber from buckling or shifting and help to ensure that the holes will be drilled in the same location in each piece of lumber. When a layer of lumber is conveyed to the apparatus, pistons lower the header which brings a spring-loaded horizontal stabilizer into contact with the lumber to stabilize the lumber. A second stabilizer pushes the lumber laterally to press the pieces of lumber together. The drill bits then penetrate the lumber after which the drill bits are retracted from the lumber, the lumber is removed for stacking, a fresh layer of lumber is conveyed to the apparatus and the process is repeated. A method for drilling holes in dimensional lumber is also disclosed.

9 Claims, 4 Drawing Sheets

APPARATUS AND METHOD FOR DRILLING HOLES IN DIMENSIONAL LUMBER

FIELD OF THE INVENTION

The present invention relates to the drilling of holes in dimensional lumber and more particularly to an apparatus and method for selectively drilling holes in one of two sizes of dimensional lumber.

BACKGROUND OF THE INVENTION

In the construction industry, it is common to use dimensional lumber such as 2"×4" lumber and 2"×6" lumber as a construction material. As such, it is often necessary to drill holes in the lumber so that electrical wires, pipes or other construction materials may be passed through the holes in the lumber.

Until recently, dimensional lumber has been manufactured and distributed to lumber yards without pre-drilled holes. The purchaser, whether a tradesman or a homeowner, then had the responsibility of drilling holes in the lumber for the purpose of running the various services through the lumber.

The task of drilling holes in the lumber can become complicated, especially for the average homeowner, since one requires the appropriate drill and drill bit to accommodate the particular service being installed. It is also necessary to know where to position the hole in the lumber for the particular service.

There has therefore developed a need for pre-drilled dimensional lumber. There has also developed a need for a device which can be integrated into a high speed lumber processing assembly without impeding production and which is capable of consistently drilling holes in a precise location in the lumber. There has also developed a need for a drilling device which can process more than one size of lumber.

SUMMARY OF THE INVENTION

According to one aspect of the present invention, there is provided an apparatus for drilling holes in pieces of elongate lumber of uniform width arranged in a plane and having an exposed surface for being drilled, the apparatus comprising: two elongate parallel guides perpendicular to the plane of the lumber; rail boxes adapted for movement along the longitudinal axes of the parallel guides between a first position and a second position; means for moving the rail boxes along the longitudinal axes of the parallel guides; a planar member extending from the rail boxes and oriented parallel to the plane of the lumber; a plurality of drill bits depending from the planar member; means for driving the drill bits; means for stabilizing the lumber in position to be drilled; wherein the spacing of the drill bits corresponds to the width of a piece of lumber.

In another aspect, the apparatus is capable of selectively drilling lumber of either a first width or a second width and the plurality of drill bits comprises: a first set of drill bits; a second set of drill bits, wherein the lateral spacing of the drill bits in the first set corresponds to the first width and the lateral spacing of the drill bits in the second set corresponds to the second width. The drill bits in the first set may be arranged in a first row and the drill bits in the second set may be arranged in a second row which is parallel to the first row with both rows being perpendicular to the longitudinal axes of the pieces of lumber.

The stabilizing means may comprise a first horizontal stabilizer depending from the planar member for applying a downward force to the lumber and a second stabilizer mounted on one of the guides for applying a lateral force to the lumber.

The second stabilizer may have projections on a surface which comes into contact with the exposed surface of the lumber for frictional engagement with the exposed surface of the lumber; reciprocating means associated with the second stabilizer for moving the surface of the second stabilizer between a rest position in which the surface of the second stabilizer does not contact the exposed surface of the lumber and an engagement position in which the surface of the second stabilizer does contact the exposed surface of the lumber.

The first stabilizer may further comprise means for biasing the first stabilizer against the exposed surface of the lumber. These biasing means may be, for example, a spring.

In another aspect of the invention, there is provided a method of drilling holes in a plurality of elongate pieces of lumber of uniform width comprising the following steps: conveying the lumber into a position wherein the lumber is arranged in a plane below a plurality of drill bits; stabilizing the lumber in a drilling position wherein the longitudinal axes of the pieces of lumber are parallel to each other, adjacent pieces of lumber are in contact with each other and an exposed surface of each piece of lumber is perpendicular to a drilling direction; simultaneously driving a plurality of drill bits such that each drill bit drills a hole in a piece of lumber; retracting the drill bits from the pieces of lumber; releasing the lumber from stabilization; and conveying the drilled lumber away from the drilling position.

The drill bits may drill holes in the same location in each piece of lumber which is drilled.

The step of stabilizing the lumber may comprise: applying a force to the lumber in the drilling direction into the plane of the lumber and applying a force perpendicular to the longitudinal axes of the pieces of lumber in the plane of the lumber.

BRIEF DESCRIPTION OF THE DRAWINGS

The present invention is described with reference to the drawings in which.

DETAILED DESCRIPTION OF THE PREFERRED EMBODIMENT

Figure 1:
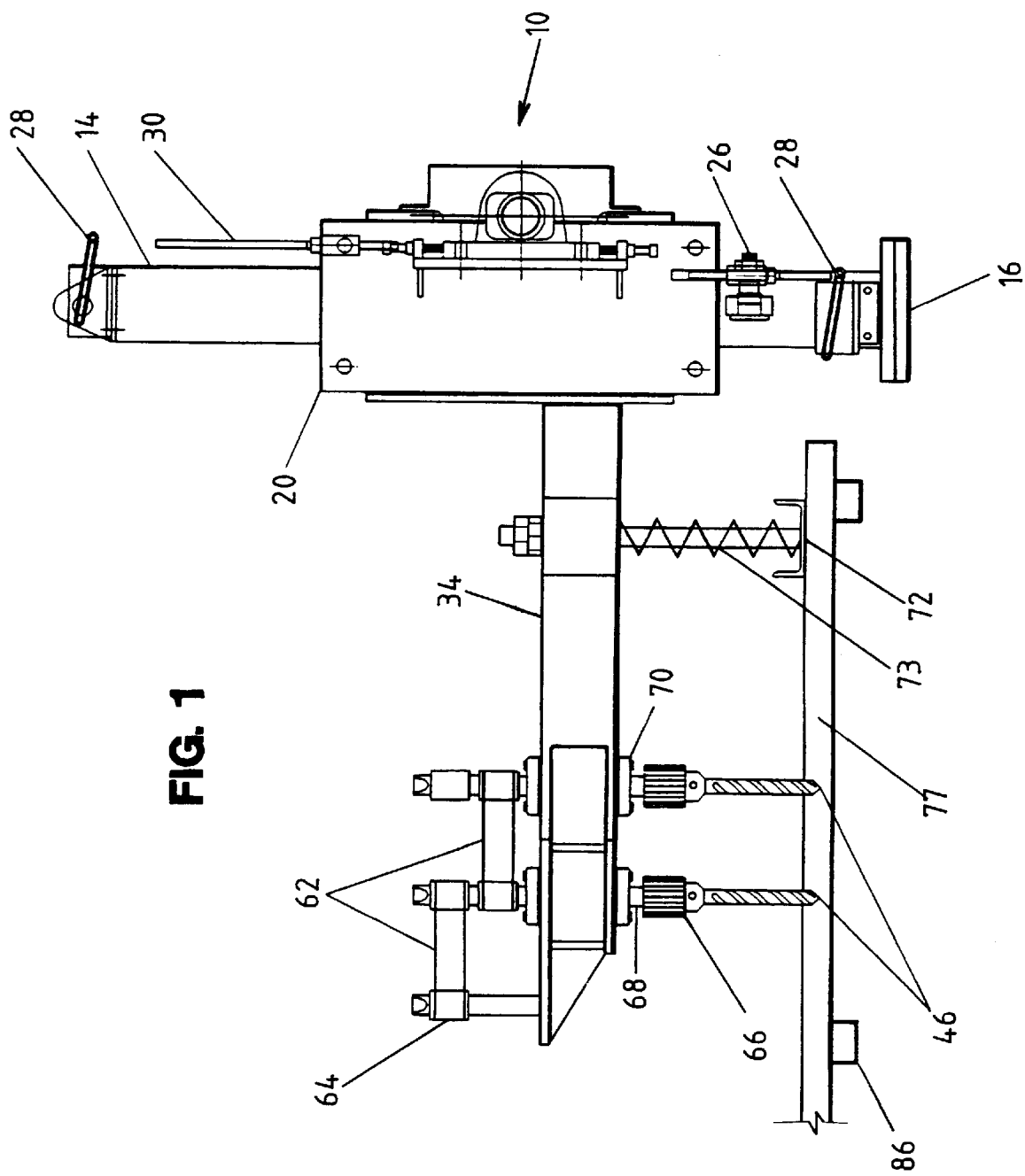
FIG. 1 is a side elevation view of the drilling assembly.
Figure 2:
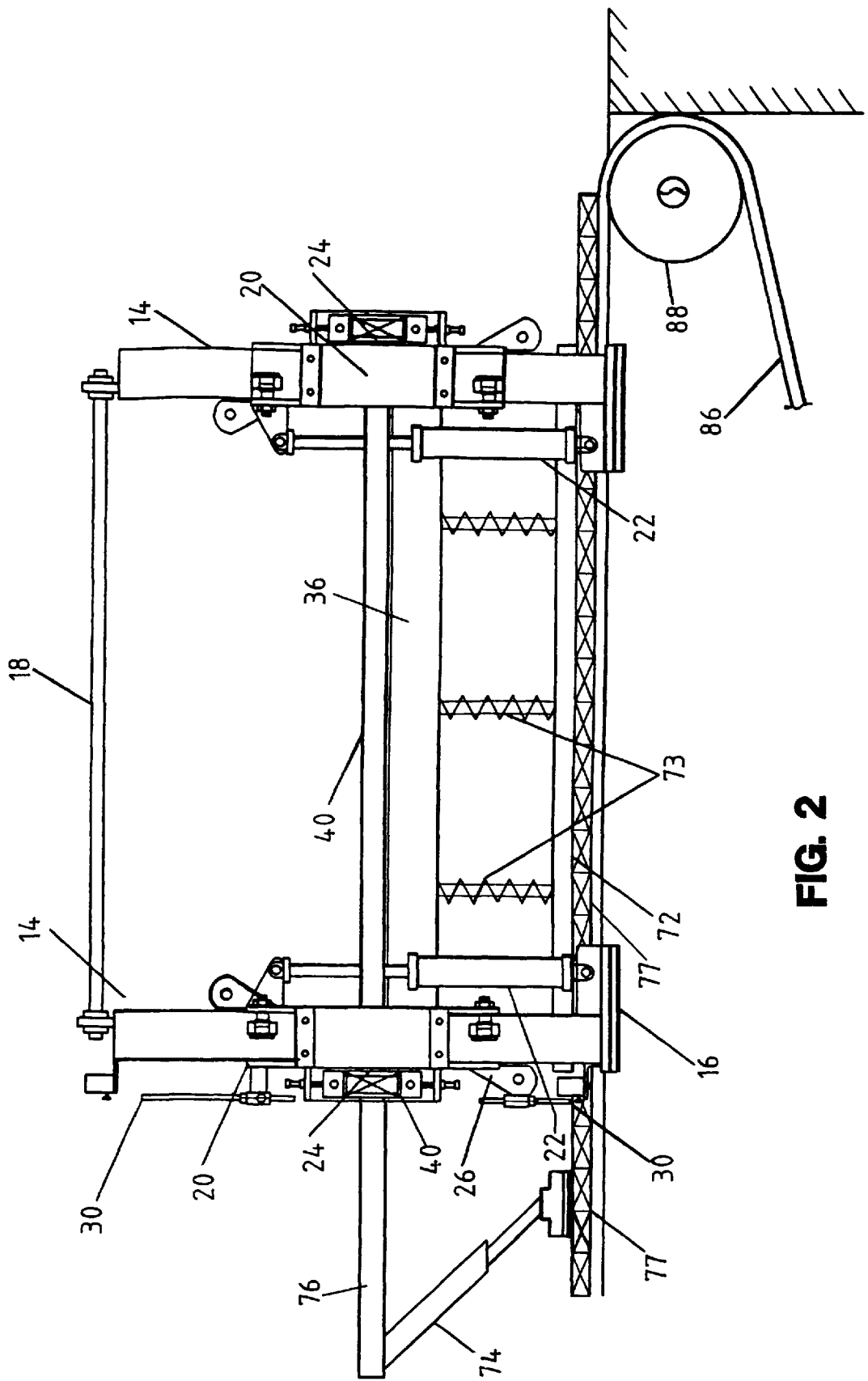
FIG. 2 is a rear elevation view of the drilling assembly.

In FIG. 1, an apparatus for drilling holes in dimensional lumber is indicated generally by numeral 10. Referring to FIGS. 1 and 2, a frame is formed from two parallel guides 14 which extend vertically from base plates 16 and from stabilizer bar 18 which extends between the guides.

Rail boxes 20 are adapted to travel vertically along the surfaces of parallel guides 14. The term "rail box" is used herein to refer to any device which is capable of travelling along guides 14. The movement of the rail boxes up and down the parallel guides is accomplished by two hydraulic cylinders 22, gear and rack means 24 and guide rollers 26. Limit switches 28 mounted at the top and bottom of the parallel guides, upon engagement by rods 30, activate the hydraulic system for piston extension or retraction.

Two support members 34 (only one of which is shown in FIG. 1) are mounted to and extend perpendicularly from rail boxes 20. Header 36 (shown in FIG. 2) is planar and is welded to the two support members 34 such that it is also perpendicular to the longitudinal axes of the rail boxes and parallel guides. Support members 34 and header 36 therefore, in operation, form a planar member. The rail boxes allow the header to move vertically without binding and while remaining level.

It is, of course, not essential for the planar member to be formed from two support members and a header. A single piece would also work well. It is also possible to combine the rail boxes and the planar member into a single piece since they move in unison.

Levelling shaft 40 extends horizontally between the parallel guides 14. A gear (not shown) keyed onto the shaft 40 rides on a gear rack (not shown) contained inside the rail box assembly. The shaft 40 is held in position by bearings 42. Levelling nuts (not shown) allow for fine adjustment after levelling the shaft.

Figure 3:
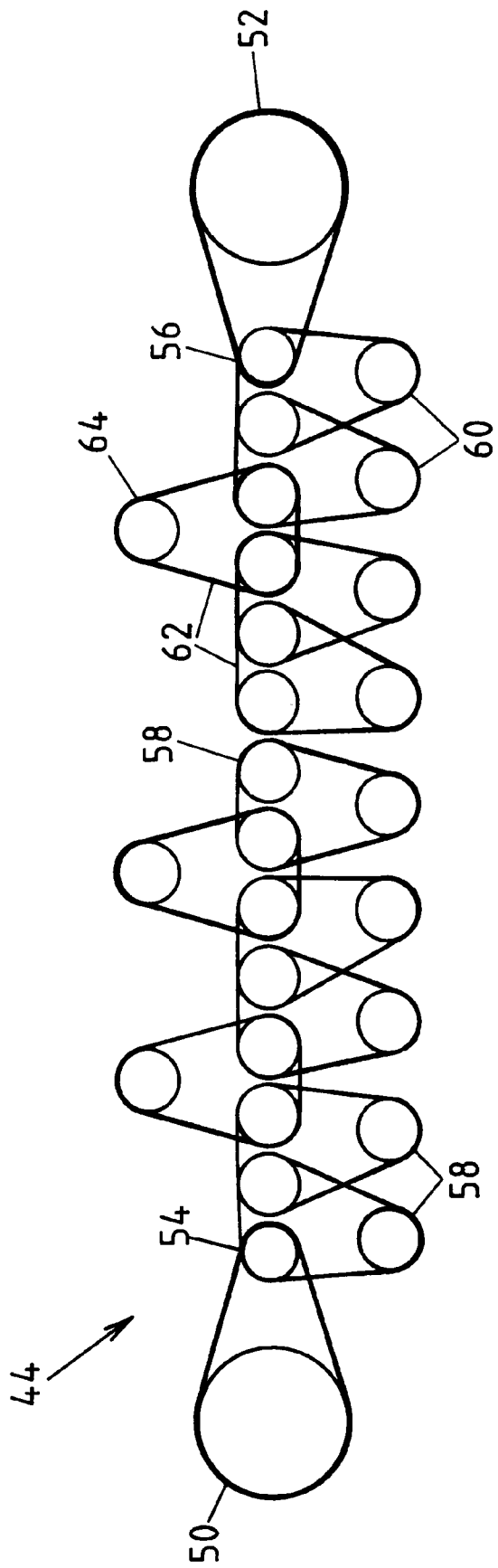
FIG. 3 is a plan view of the spindle sprocket assembly of the invention.

A spindle sprocket assembly, indicated generally by numeral 44 in FIG. 3, is mounted on header 36. The spindle sprocket assembly retains and drives drill bits 46, shown in FIG. 1. In the preferred embodiment, the drill bits are arranged such that there are 14 drill bits in one row for drilling holes in 2"×4" lumber and 9 drill bits in a second row for drilling 2"×6" lumber. Referring to FIG. 3, electric motors 50, 52 drive end spindle sprockets 54 and 56, respectively which, in turn, drive the remaining sprockets 58, 60 by means of interwoven belts 62. For end spindle sprockets 54 and 56, sprockets of the type sold under the trade-mark EAGLE as model nos. W-285-H have been found to work particularly well whereas EAGLE W-30S-H sprockets are recommended for the remaining sprockets 58, 60.

Referring to FIG. 3, the nine spindle sprockets in the bottom row correspond to the drill bits which are used to drill holes in 2"×6" lumber whereas the fourteen spindle sprockets in the middle row correspond to the drill bits which are used to drill holes in 2"×4" lumber. The three spindle sprockets in the top row of FIG. 3 are idler spindle sprockets 64 which do not drive any drill bits.

As shown in FIG. 1, each ¾" diameter drill bit 46 is inserted into a drill chuck 66. Drill chuck 66 is threaded onto a 1" diameter spindle 68. The spindle is keyed to accept two sprockets as discussed above.

The spindles 68 pass through the header 36 and are held in place by bearings 70. Medium duty piloted flanged bearings sold under the trade-mark DODGE SCM are suitable for this purpose.

In a lumber processing facility, by the time that the lumber reaches the drilling apparatus of the present invention, it has been sawn, dried, planed, sorted according to dimensional size and length, conveyed to a stacker machine which then assembles the correct number of lumber pieces to form a layer and conveys the desired number of pieces of lumber to the drilling assembly of the present invention. Given the continuous nature of the operation of a lumber processing facility, the stacker provides a continuous feed of lumber to the drilling assembly even though only fourteen pieces of 2"×4" lumber or nine pieces of 2"×6" lumber are drilled at any one time. Once these nine or fourteen pieces of lumber have been drilled, the next pieces of lumber in line are then conveyed to the drilling assembly.

Upon a stack of lumber arriving at the drilling assembly, the lumber must first be stabilized in position before any drilling commences to ensure that the holes are consistently drilled in the correct locations. Given the fact that there are small variations in size from one piece of lumber to another and given the fact that lumber is prone to buckle, it has been found that stabilizing the lumber by applying forces in two directions, namely in a downward direction and laterally, helps to position the lumber for consistently drilled holes.

Figure 4:
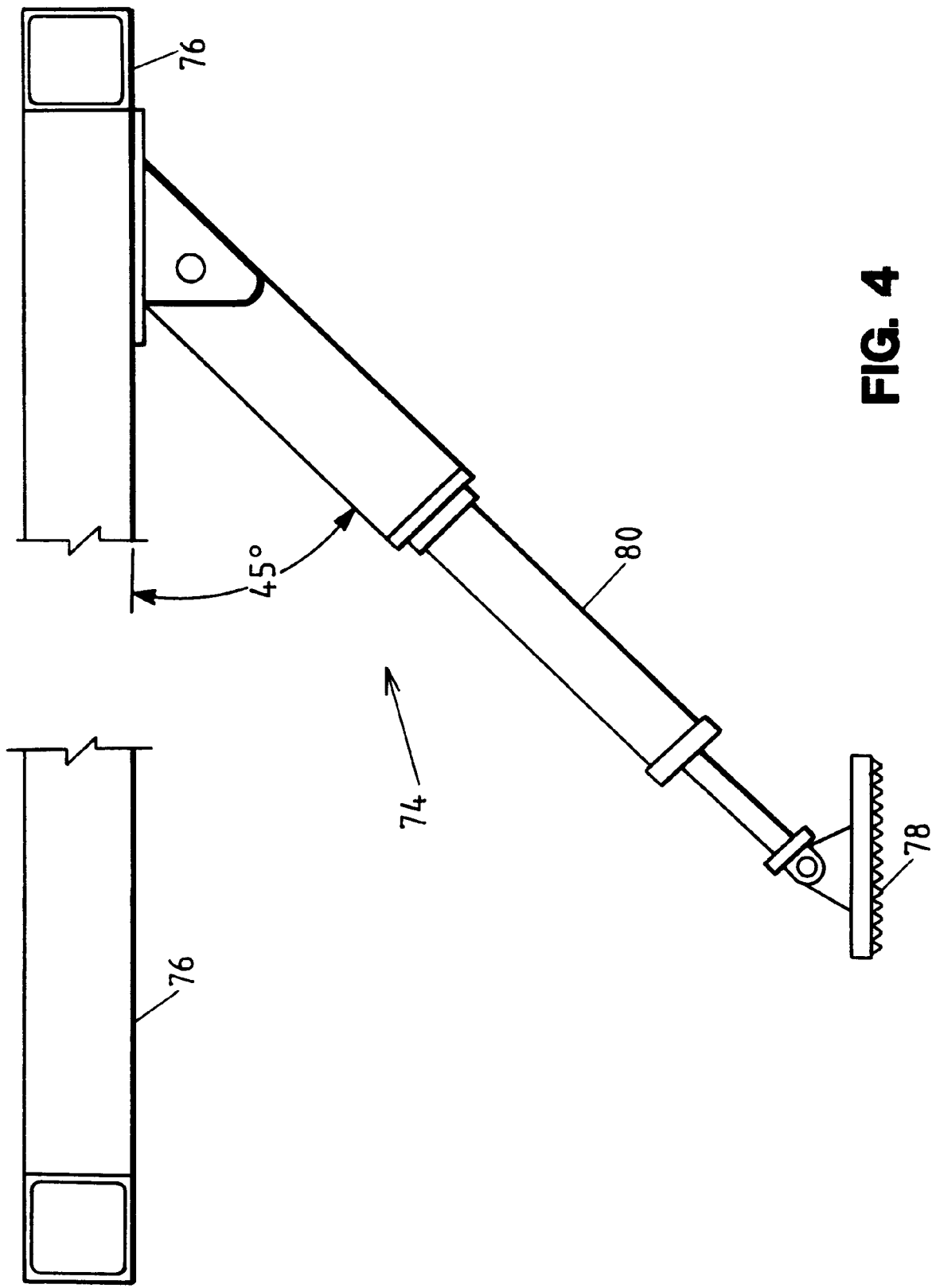
FIG. 4 is an elevation view of one of the lumber stabilizing means of the invention.

FIGS. 1, 2 and 4 illustrate two stabilizers 72 and 74 which are utilized for this purpose. First stabilizer 72, shown in FIGS. 1 and 2, depends from header 36 and is oriented with its bottom surface parallel to the plane of the lumber and perpendicular to the guides 14. At rest, the bottom surface of stabilizer 72 is approximately 1" below the lower tips of the drill bits. Stabilizer 72 is spring loaded such that when the rail boxes are lowered, stabilizer 72 comes into contact with the exposed surface of the lumber prior to the drill bits contacting the surface. Upon stabilizer 72 contacting the lumber, the spring 73 or other biasing means in the stabilizer then compresses while the drill bits approach and then penetrate the lumber. When the drill bits are being retracted, stabilizer 72 overcomes the tendency of the drill bits to pull the lumber vertically by continuing to press down on the exposed surface of the lumber while the drill bits are being retracted.

Second stabilizer 74, shown in FIGS. 2 and 4, is mounted on the stacker 76, and descends at a 45° angle to press the layer of lumber 72 horizontally together against a stop guard (not shown). It is also possible to mount the stacker on the frame of the drilling assembly itself. In FIG. 2, stacker 76 is mounted to guide 14. Stabilizer 74 therefore exerts a force on the lumber which has a lateral component that causes adjacent pieces of lumber to lie relatively flush and parallel to each other. This lateral component of the force is perpendicular to the longitudinal axis of the lumber.

As shown in FIG. 4, second stabilizer 74 has teeth 78 on the surface which is in contact with the lumber. These teeth enable the stabilizer 74 to maintain the lumber in position during drilling. Hydraulic piston 80 alternately brings teeth 78 into contact with the lumber and retracts the stabilizer from contact with the lumber.

In practice, stabilizer 74 has been found to work best if it does not come into contact with the lumber which is presently being drilled but instead comes into contact with the pieces of lumber which are adjacent the pieces of lumber being drilled. For example, if 14 pieces of 2"×4" lumber are being drilled, the stabilizer 74 might come into contact with the seventeenth or eighteenth piece of lumber. By applying pressure on this piece of lumber, all seventeen pieces of lumber (including the 14 pieces which are to be drilled) are pressed against the stop guard and maintained in position prior to and during the drilling process.

The preferred embodiment which is illustrated in the drawings is capable of drilling ¾" diameter holes in either 2"×4" lumber or 2"×6" lumber. It is, of course, possible to adapt the preferred embodiment to drill holes in other sizes of lumber or other combinations of lumber sizes. It is also possible to adapt the preferred embodiment to drill differently sized holes or to drill holes in different locations in the lumber.

If 2"×4" lumber is being drilled, 14 pieces of lumber will be drilled at the same time. If 2"×6" lumber is being drilled, 9 pieces of lumber will be drilled. If 2"×6" lumber is being processed, the drill bits in the 2"×4" row may be removed and the drill bits in the 2"×6" row then used to drill holes in the lumber. The drill of the preferred embodiment may be adapted to drill more or fewer pieces of lumber.

As part of the continuous process of a lumber processing facility, more than 14 pieces of lumber will be present in the stacker at any time when 2"×4" lumber is being processed. However, only 14 pieces will be drilled at one time. Once these pieces have been drilled, they are then stacked for bundling and the next 14 pieces of lumber are then conveyed by the stacker for drilling. The same process is applicable with respect to the drilling of 2"×6" lumber. Chain 86 rotates around drive sprocket 88 to convey the lumber in a direction away from apparatus 10.

In operation, once a layer of lumber has been conveyed by the stacker to the drilling apparatus, the lumber is stabilized in position and the rail box assemblies are lowered along the parallel guides 14 such that the drill bits 46 penetrate the lumber. Once the holes have been drilled, the rail box assemblies are then raised along the parallel guides such that the drill bits are retracted from the lumber. The layer of lumber is then stacked for bundling and the process is repeated.

This description is made with reference to the preferred embodiment of the invention. It is possible, however, to make other embodiments that employ the principles of the invention and that fall within its spirit and scope as defined by the following claims.

What is claimed is:

1. An apparatus for selectively drilling holes in pieces of elongate lumber of either a first width or a second width, the pieces of lumber being arranged in a plane and having an exposed surface for being drilled, the apparatus comprising:

two elongate parallel guides perpendicular to the plane of the lumber;

rail boxes adapted for movement along the longitudinal axes of the parallel guides between a first position and a second position;

means for moving the rail boxes along the longitudinal axes of the parallel guides;

a planar member extending from the rail boxes and oriented parallel to the plane of the lumber;

first and second sets of of drill bits depending from the planar member wherein the lateral spacing of the drill bits in the first set corresponds to the first width and the lateral spacing of the drill bits in the second set corresponds to the second width of lumber;

means for driving the drill bits;

means for stabilizing the lumber in position to be drilled;

wherein the spacing of the drill bits corresponds to the width of a piece of lumber.

2. A method of drilling holes in a plurality of elongate pieces of lumber of uniform width comprising the following steps:

conveying the lumber into a position wherein the lumber is arranged in a plane below a plurality of drill bits;

stabilizing the lumber in a drilling position wherein the longitudinal axes of the pieces of lumber are parallel to each other, adjacent pieces of lumber are in contact with each other and an exposed surface of each piece of lumber is perpendicular to a drilling direction;

simultaneously driving a plurality of drill bits such that each drill bit drills a hole in a piece of lumber;

retracting the drill bits from the pieces of lumber;

releasing the lumber from stabilization; and conveying the drilled lumber away from the drilling position.

3. The apparatus of claim 1, wherein:

the drill bits in the first set are arranged in a first row and the drill bits in the second set are arranged in a second row which is parallel to the first row and both rows are perpendicular to the longitudinal axes of the pieces of lumber.

4. The apparatus of claim 1, wherein when the rail boxes are in the first position, neither the drill bits nor the stabilizing means are in contact with the lumber and when the rail boxes are in the second position, both the drill bits and the stabilizing means are in contact with the lumber.

5. The apparatus of claim 4, wherein:

a horizontal arm is mounted to one of the guides;

and the stabilizing means comprise a first horizontal stabilizer depending from the planar member for applying a downward force to the lumber and a second stabilizer mounted on the horizontal arm and descending from the horizontal arm at an oblique angle for applying a lateral force to the lumber.

6. The apparatus of claim 5, further comprising:

projections on a surface of the second stabilizer which comes into contact with the exposed surface of the lumber for frictional engagement with the exposed surface of the lumber;

reciprocating means associated with the second stabilizer for moving the surface of the second stabilizer between a rest position in which the surface of the second stabilizer does not contact the exposed surface of the lumber and an engagement position in which the surface of the second stabilizer does contact the exposed surface of the lumber.

7. The apparatus of claim 4, wherein the first stabilizer further comprises means for biasing the first stabilizer against the exposed surface of the lumber.

8. The method of claim 2, wherein the step of stabilizing the lumber comprises:

applying a force to the lumber in the drilling direction into the plane of the lumber and applying a force perpendicular to the longitudinal axes of the pieces of lumber in the plane of the lumber.

9. The method of claim 2, wherein the drill bits drill holes in the same location in each piece of lumber which is drilled.

* * * * *

UNITED STATES PATENT AND TRADEMARK OFFICE
CERTIFICATE OF CORRECTION

PATENT NO. : 6,039,514
DATED : March 21, 2000
INVENTOR(S) : O'Donovan et al.

It is certified that error appears in the above-identified patent and that said Letters Patent is hereby corrected as shown below:

Column 5, line 40, "sets of of drill bits" should be --sets of drill bits--.

Signed and Sealed this

Twenty-fourth Day of April, 2001

Attest:

NICHOLAS P. GODICI

Attesting Officer   Acting Director of the United States Patent and Trademark Office